US012429209B1

(12) United States Patent
She

(10) Patent No.: US 12,429,209 B1
(45) Date of Patent: Sep. 30, 2025

(54) WATERPROOF ELECTRONIC CANDLE

(71) Applicant: Dongguan Shuiquanzi Industrial Co., Ltd., Guangdong (CN)

(72) Inventor: Huilin She, Guangdong (CN)

(73) Assignee: Dongguan Shuiquanzi Industrial Co., Ltd., Dongguan (CN)

(*) Notice: Subject to any disclaimer, the term of this patent is extended or adjusted under 35 U.S.C. 154(b) by 0 days.

(21) Appl. No.: 19/240,075

(22) Filed: Jun. 17, 2025

Related U.S. Application Data

(63) Continuation-in-part of application No. 18/790,422, filed on Jul. 31, 2024.

(30) Foreign Application Priority Data

| | | |
|---|---|---|
| Aug. 4, 2023 | (CN) | 202310978490.1 |
| Aug. 4, 2023 | (CN) | 202322091015.0 |
| May 7, 2025 | (CN) | 202520891352.4 |
| May 22, 2025 | (CN) | 202521031273.2 |

(51) Int. Cl.

| | |
|---|---|
| ***F21S 10/04*** | (2006.01) |
| ***F21S 4/20*** | (2016.01) |
| ***F21S 9/02*** | (2006.01) |
| ***F21V 17/10*** | (2006.01) |
| ***F21V 23/00*** | (2015.01) |
| ***F21V 23/02*** | (2006.01) |
| ***F21V 31/00*** | (2006.01) |
| ***F21V 31/03*** | (2006.01) |

(52) U.S. Cl.
CPC .............. *F21V 31/005* (2013.01); *F21S 4/20* (2016.01); *F21S 9/02* (2013.01); *F21S 10/04* (2013.01); *F21V 17/101* (2013.01); *F21V 23/009* (2013.01); *F21V 23/023* (2013.01); *F21V 31/03* (2013.01)

(58) Field of Classification Search
CPC ... F21V 31/005; F21S 4/20; F21S 9/02; F21S 10/04
See application file for complete search history.

(56) References Cited

U.S. PATENT DOCUMENTS

2023/0184406 A1* 6/2023 Kuno ........................ F21V 5/06
362/311.02

* cited by examiner

*Primary Examiner* — Fatima N Farokhrooz

(57) ABSTRACT

A waterproof electronic candle includes a housing assembly and a cover, the housing assembly includes a candle tube, the candle tube includes a first end and a second end arranged below the first end; the cover sleeved over the candle tube, an annular recess is defined in one of the candle tube and the cover at the first end, and an annular protrusion is arranged on the other one of the candle tube and the cover at the first end; the housing assembly further includes a sealing member received in the annular recess, the annular protrusion contacts the sealing member to sealingly connect the candle tube with the cover.

18 Claims, 11 Drawing Sheets

WATERPROOF ELECTRONIC CANDLE

CROSS REFERENCE TO RELATED APPLICATIONS

The present application is a continuation-in-part application of the U.S. patent application Ser. No. 18/790,422, filed on Jul. 31, 2024, contents of which are incorporated by reference herein in their entirety.

The present application claims the priority of Chinese patent application No. 202520891352.4, filed on May 7, 2025; Chinese patent application No. 202521031273.2, filed on May 22, 2025; Chinese patent application No. 202310978490.1, filed on Aug. 4, 2023; Chinese patent application No. 202322091015.0, filed on Aug. 4, 2023, contents of each of which are incorporated herein by its entirety.

FIELD

The present disclosure relates to the field of candles, and particularly to a waterproof electronic candle.

BACKGROUND

The electronic candle in the related art generally includes a cover configured as a tubular structure, the cover having an opening at each of its two ends and being sleeved over a candle tube to improve aesthetic appearance. However, when the electronic candle is used outdoors, rainwater can easily enter a gap between the cover and the candle tube. Due to the lack of a sealing structure, the rainwater may further seep into an interior of the candle tube, which may cause circuit short, circuiting or corrosion of electronic components.

Therefore, improvements to existing electronic candles are needed to address the above deficiencies.

SUMMARY

A waterproof electronic candle includes a housing assembly and a cover, the housing assembly includes a candle tube, the candle tube includes a first end and a second end arranged below the first end; the cover sleeved over the candle tube, an annular recess is defined in one of the candle tube and the cover at the first end, and an annular protrusion is arranged on the other one of the candle tube and the cover at the first end; the housing assembly further includes a sealing member received in the annular recess, the annular protrusion contacts the sealing member to sealingly connect the candle tube with the cover.

BRIEF DESCRIPTION OF THE DRAWINGS

To provide a clearer illustration of the technical solutions in the embodiments of the present disclosure or in the prior art, a brief introduction will be given to the drawings used in the description of the embodiments or the prior art. It is obvious that the drawings described below are merely some embodiments of the present disclosure, and for those skilled in the art, other drawings can be obtained based on these drawings without creative efforts.

REFERENCE NUMERALS IN THE DRAWINGS

Figure 1:
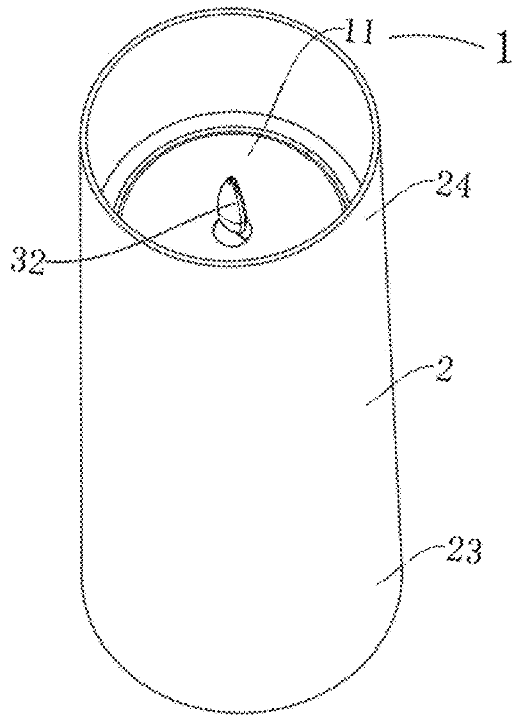
FIG. 1 is a structural schematic view of a waterproof electronic candle according to an embodiment of the present disclosure.
Figure 2:
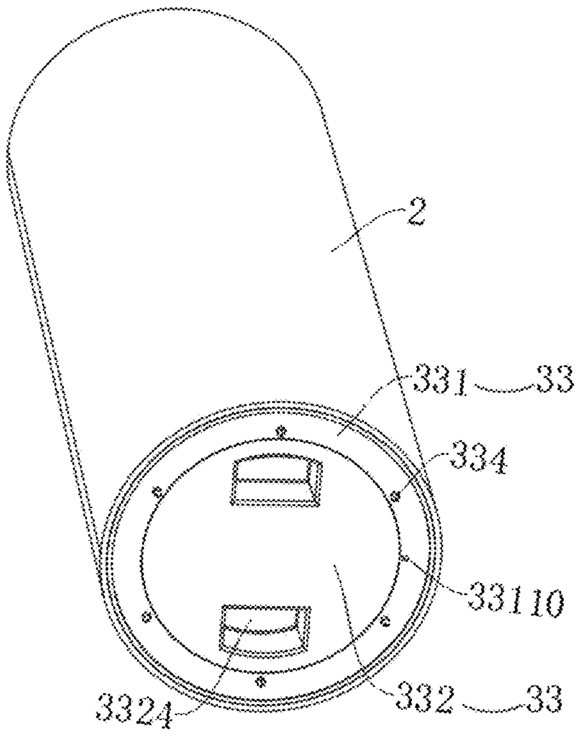
FIG. 2 is another structural schematic view of the waterproof electronic candle according to an embodiment of the present disclosure.

1, housing assembly; 11, candle tube; 111, first end; 1111, end surface; 1112, annular flange; 1113, drainage groove; 1114, descending surface; 1115, drainage hole; 1116, receiving recess; 1117, water guiding post; 11161, bottom surface; 11162, through hole; 11163, supporting surface; 112, second end; 113, annular recess; 114, drainage pipe; 1141, inlet end; 1142, outlet end; 115, hollow cavity; 116, waterproof pad; 12, sealing member; 2, cover; 21, annular protrusion; 22, annular groove; 23, third end; 24, fourth end; 3, core assembly; 31, PCBA; 32, lamp head; 33, battery case; 331, case body; 3311, first peripheral wall; 3312, first opening; 3313, third peripheral wall; 3314, top wall; 3315, fourth peripheral wall; 3316, battery; 3317, battery cover; 3318, battery chamber; 3319, second opening; 33110, outlet hole; 33111, water discharging post; 332, waterproof cover; 3321, bottom wall; 3322, second peripheral wall; 33221, waterproof groove; 3323, waterproof ring; 33231, sealing layer; 3324, operation slot; 334, support legs; 4, light string.

DETAILED DESCRIPTION

Unless otherwise defined, all technical and scientific terms used herein have the same meaning as commonly understood by those skilled in the art to which this disclosure belongs. The terms used in the description of the application herein are intended for describing particular embodiments only and are not intended to limit the present disclosure. In the description, claims, and the above drawings of the present disclosure, the terms "comprising" and "having", as well as their variants, are intended to convey a non, exclusive inclusion. The terms "first", "second", etc., as used herein, are intended to distinguish between different objects, rather than to describe a particular order.

Reference to "embodiments" herein implies that a particular feature, structure, or characteristic described in connection with an embodiment may be included in at least one embodiment of the present disclosure. The appearance of the phrase at various places in the specification does not necessarily refer to the same embodiment, nor is it a separate or alternative embodiment that is mutually exclusive of other embodiments. One skilled in the art would explicitly and implicitly understand that the embodiments described herein can be combined with other embodiments.

In order to enable those skilled in the art to better understand the technical solutions of the present disclosure, the technical solutions in the embodiments of the present disclosure will be clearly and completely described below with reference to the accompanying drawings.

To solve the above technical problem, as shown in FIGS. 1 to 4, an embodiment of the present disclosure provides a waterproof electronic candle, which includes a housing assembly 1. The housing assembly 1 includes a candle tube 11. The candle tube 11 includes a first end 111 and a second end 112 end positioned below the first end 111, the first end 111 faces a direction of rainfall. The waterproof electronic candle further includes a cover 2 sleeved over the candle tube 11. The cover 2 includes a third end 23 and a fourth end 24, and the cover is configured as a tubular structure, and both the third end 23 and the fourth end 24 have an opening. An annular recess 113 is defined in one of the candle tube 11 and the cover 2, and an annular protrusion 21 is positioned on the other one of the candle tube 11 and the cover 2. In other words, when the annular recess 113 is defined in the candle tube 11, the annular protrusion 21 is positioned on the cover 2; when the annular recess 113 is defined in the cover 2, the annular protrusion 21 is arranged on the candle tube 11. The housing assembly 1 further includes a sealing member 12. The sealing member 12 is received in the annular recess 113, the annular protrusion 21 is positioned on the sealing member 12 to sealingly connect the cover 2 with the candle tube 11, such that the rainwater can not seep into a space between the cover 2 and the candle tube 11, and a waterproof performance of the electronic candle is improved when the electronic candle is used outdoors. In some embodiments, the candle tube 11 may be made of paraffin, such that an external appearance of the candle tube 11 can resemble that of a real candle. Alternatively, the candle tube 11 may be made of plastic materials, such as polyethylene (PE), polypropylene (PP), or polycarbonate (PC), which can also provide the external appearance similar to the real candle.

Figure 3:
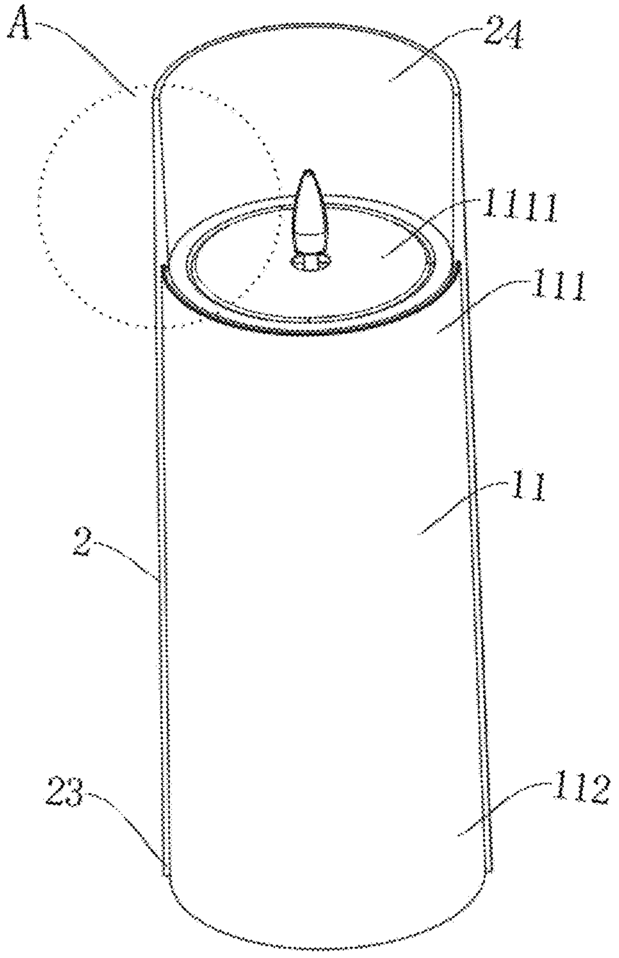
FIG. 3 is a partial sectional structural schematic view of the waterproof electronic candle according to an embodiment of the present disclosure.
Figure 4:
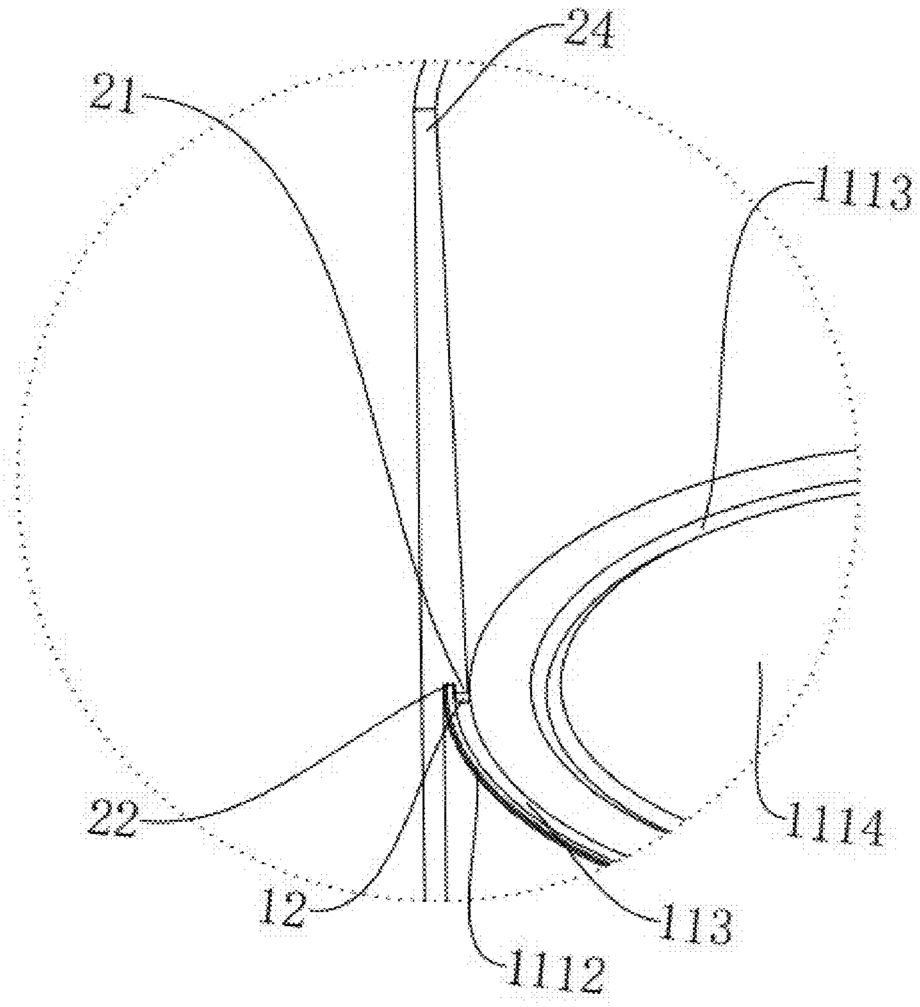
FIG. 4 is a enlarged view of portion A in FIG. 3.

In an embodiment of the present disclosure, with reference to FIG. 3 and FIG. 4, the first end 111 of the candle tube 11 is configured as a closed end to form an end surface 1111. The annular recess 113 is defined adjacent to an edge of the end surface 1111, an annular flange 1112 is formed at the edge of the end surface 1111. A wall thickness of a portion of the cover 2 near the annular flange 1112 is increased, such that a stepped surface is formed on the cover. An annular protrusion 21 is formed on the stepped surface and is configured to protrude downwardly, an annular groove 22 is defined in an outer side of the annular protrusion 21. When the annular flange 1112 is received in the annular groove 22, the annular protrusion 21 is positioned on the sealing member 12, such that sealed connection between the cover 2 and the candle tube 11 is achieved. During assembly, the candle tube 11 can be inserted into the cover 2 from the third end 23 of the cover 2 and moved upward until the annular protrusion 21 contacts the sealing member 12. The annular protrusion 21 and the annular recess 113 are arranged in a vertical direction to facilitate the assembly between the candle tube 11 and the cover 2. In another embodiment, the annular recess 113 may be defined in one of an outer peripheral wall of the first end 111 and an inner peripheral wall of the cover 2; correspondingly, the annular protrusion 21 may be disposed on the other one of the outer peripheral wall of the first end 111 and the inner peripheral wall of the cover 2. A sealed connection between the annular protrusion 21 and the annular recess 113 can also be achieved by the sealing member 12. The annular protrusion 21 may be elastically deformable, such that the candle tube 11 and the cover 2 can be installed with each other conveniently.

In an embodiment, with reference to FIG. 3 and FIG. 4, the cover 2 includes the third end 23 and the fourth end 24. The cover 2 is configured as the tubular structure, and both the third end 23 and the fourth end 24 have an opening. The third end 23 is flush or substantially flush with the second end 112 of the candle tube 11, and the fourth end 24 is positioned above the first end 111 of the candle tube 11. From the annular protrusion 21 to the fourth end 24, the wall thickness of the cover 2 gradually decreases along an axial direction of the candle tube 11. A portion of the cover 2 where the annular protrusion 21 is arranged has an increased wall thickness, such that the cover 2 can withstand a connecting force and a sealing pressure. The increased wall thickness enhances structural stability and sealing performance of the connection between the cover 2 and the candle tube 11. In addition, the increased wall thickness enables formation of the stepped surface, allowing both the annular groove 22 and the annular protrusion 21 to be formed on the stepped surface. As the cover 2 extends toward the fourth end 24, the connecting force and the sealing pressure gradually decrease. A gradual reduction in the wall thickness from the annular protrusion 21 to the fourth end 24 can reduce an overall weight of the cover 2. It can be understood that the portion of the cover 2 where the annular protrusion 21 is arranged has a greater thickness than a portion of the cover 2 extending from the annular protrusion 21 to the third end 23.

Figure 5:
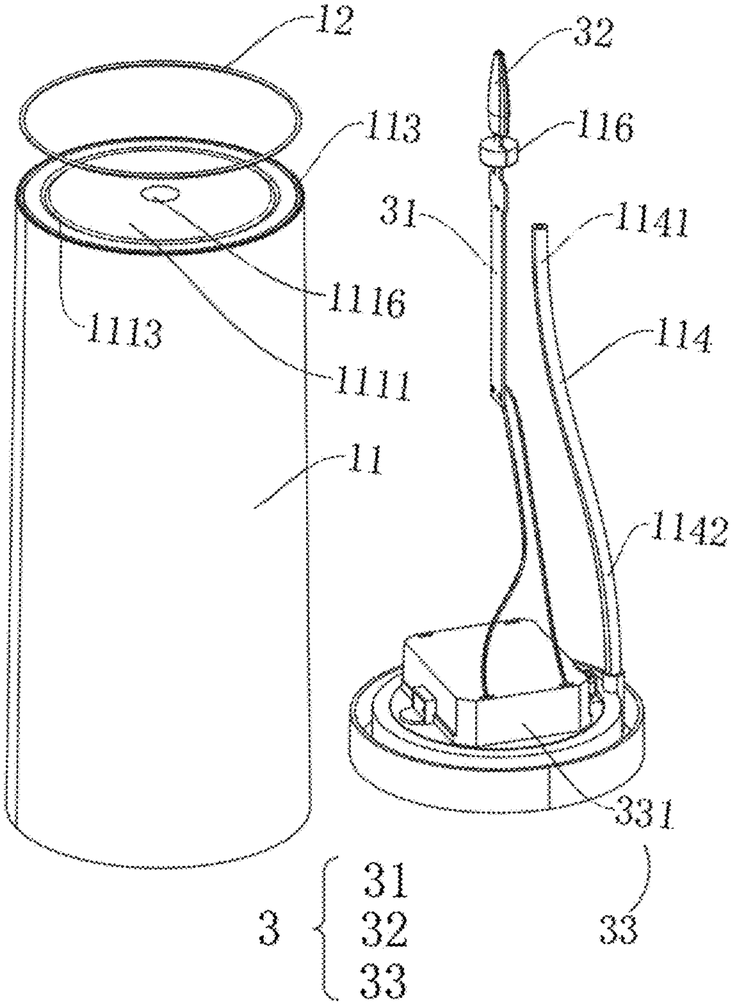
FIG. 5 is a partially exploded structural schematic view of the waterproof electronic candle according to an embodiment of the present application.

In an embodiment of the present disclosure, as shown in FIGS. 4 and 5, the first end 111 of the candle tube 11 is configured to be closed to form the end surface 1111. An annular drainage groove 1113 is defined in the end surface 1111 and is positioned at an outer peripheral portion of the end surface 1111. The end surface 1111 includes a central portion, a descending surface 1114 is formed between the central portion and the drainage groove 1113, the central portion is higher than the drainage groove 1113, such that rainwater falling on the end surface 1111 can converge and flow into the drainage groove 1113. In an embodiment, the drainage groove 1113 is configured as an arc U-shaped structure, which facilitates the rainwater converging. A drainage hole 1115 is defined in a bottom portion of the drainage groove 1113. The housing assembly 1 further includes a drainage pipe 114, and the drainage pipe 114 is configured to be in communication with the drainage hole 1115 and with an exterior of the candle tube 11, such that rainwater inside the drainage groove 1113 can be discharged to the exterior of the candle tube 11.

Figure 7:
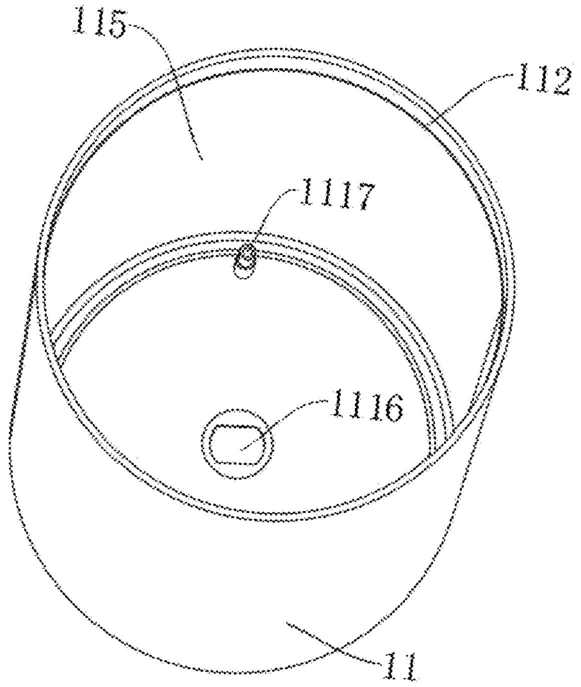
FIG. 7 is another perspective structural schematic view of the candle tube according to an embodiment of the present application.

In an embodiment, as shown in FIGS. 5 and 7, a hollow cavity 115 is defined inside the candle tube 11. The second end 112 of the candle tube 11 has an opening to communicated with the hollow cavity 115. The waterproof electronic candle further includes a core assembly 3. The core assembly 3 includes a Printed Circuit Board Assembly (PCBA) 31 and a lamp head 32. The PCBA 31 is configured as a strip-shaped structure and is arranged in the hollow cavity 115 along the axial direction of the candle tube 11. One end of the PCBA 31 includes an elongated handle portion and a conical head portion. The handle portion passes through a through hole 11162. The lamp head 32 includes a plurality of light-emitting beads disposed on the head portion, and a lamp head cover sleeved on the head portion.

Figure 6:
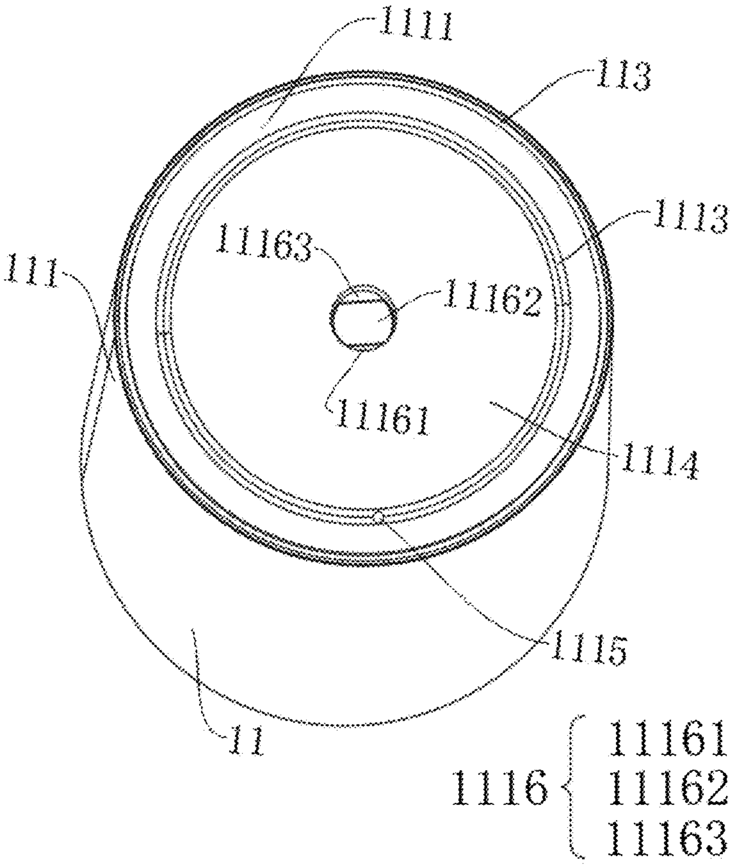
FIG. 6 is a structural schematic view of the candle tube according to an embodiment of the present application.

In an embodiment, as shown in FIGS. 5 and 6, a first end 111 of the candle tube 11 is closed to form the end surface 1111. A receiving recess 1116 is defined in the end surface 1111. In an embodiment, the receiving recess 1116 is positioned at the central portion of the end surface 1111, and an opening of the receiving recess 1116 faces upwardly. The receiving recess 1116 includes a bottom surface 11161, and a through hole 11162 is defined in the bottom surface 11161. The handle portion of the PCBA 31 passes through the through hole 11162. The housing assembly 1 further includes a waterproof pad 116. The waterproof pad 116 is disposed in the receiving recess 1116 and is in an interference fit with both the receiving recess 1116 and the PCBA 31. The waterproof pad 116 can be made of materials such as silicone or rubber having elastic deformation capability. Since the handle portion of the PCBA 31 also passes through the waterproof pad 116, the waterproof pad 116 can be compressed between the handle portion of the PCBA 31 and the receiving recess 1116, such that the through hole 11162 can be sealed, and the rainwater can not enter the candle tube 11 through the through hole 11162.

In an embodiment, as shown in FIG. 6, a sectional area of the through hole 11162 is smaller than an area of the bottom surface 11161, and a supporting surface 11163 is formed on the bottom surface 11161 to stably support the waterproof pad 116, such that the waterproof pad 116 can be flatly placed on the bottom surface 11161, and can be prevented from shifting when being compressed.

Figure 8:
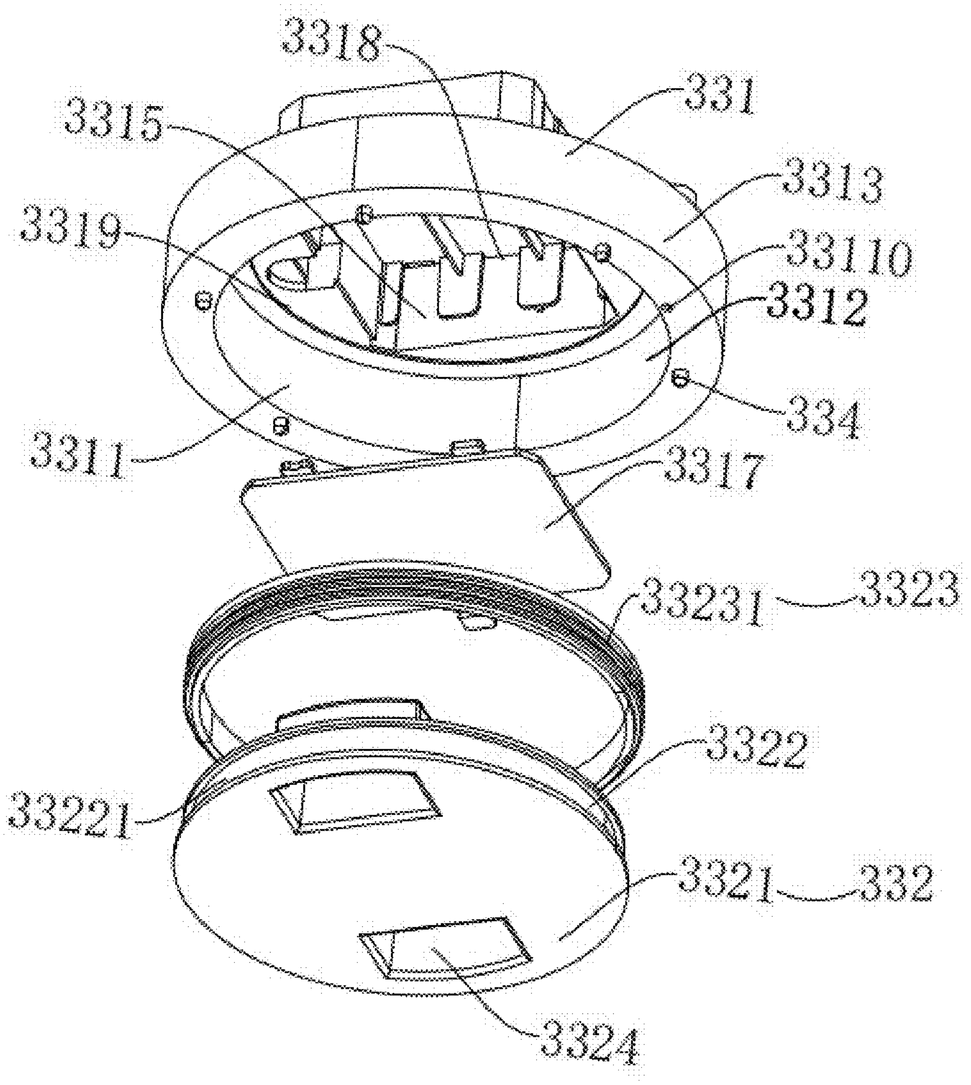
FIG. 8 is an exploded structural schematic view of the battery case according to an embodiment of the present application.
Figure 9:
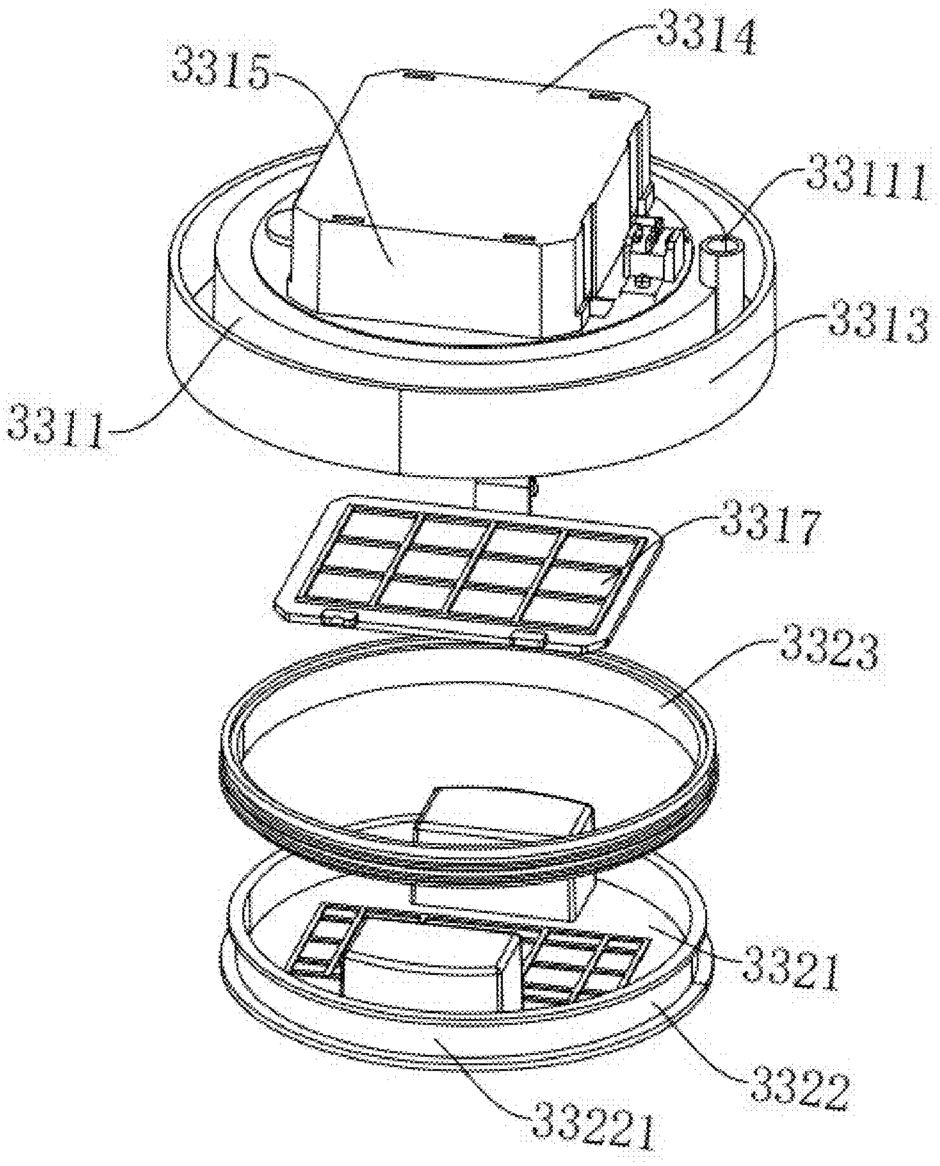
FIG. 9 is another exploded structural schematic view of the battery case according to an embodiment of the present application.
Figure 10:
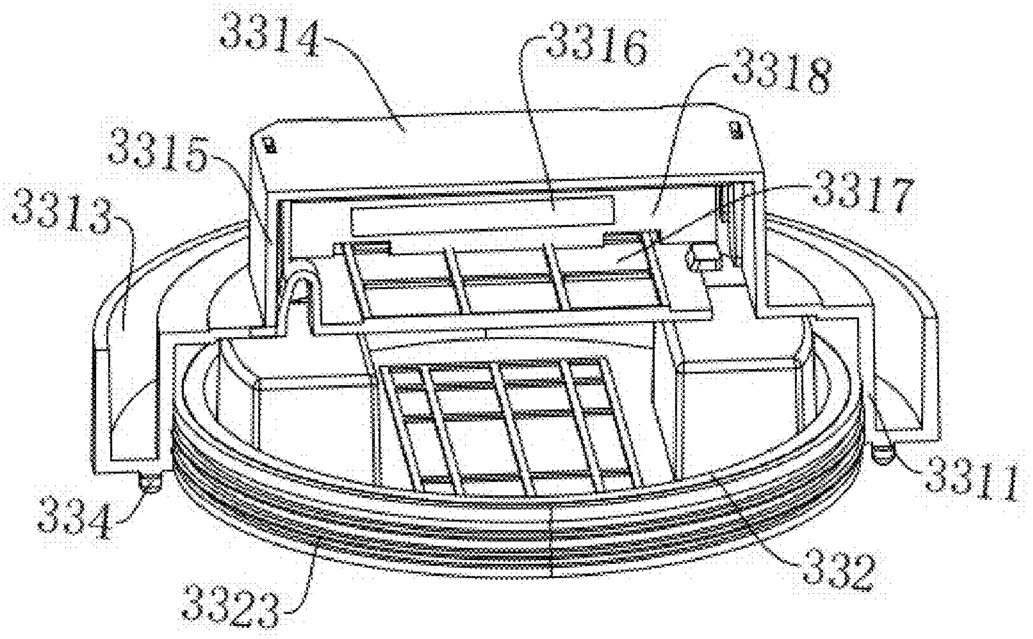
FIG. 10 is a partial sectional structural schematic view of the battery case according to an embodiment of the present application.

In an embodiment, as shown in FIGS. 8 to 10, the core assembly 3 further includes a battery case 33. The battery case 33 is configured to provide a mounting space for a battery 3316. A conductive plate is disposed on the battery case 33 and electrically connected to the battery 3316. The PCBA 31 is electrically connected to the conductive plate via a wire, such that the battery case 33 can supply power to the PCBA 31. The battery case 33 includes a case body 331 and a waterproof cover 332. The case body 331 is configured to seal the second end 112 of the candle tube 11. A first opening 3312 is defined in a bottom side of the case body 331 to facilitate installation and replacement of the battery 3316. The waterproof cover 332 sealingly engages the first opening 3312 through a waterproof ring 3323, keeping the rainwater out of the battery case 33.

In an embodiment of the present disclosure, as shown in FIGS. 8 to 10, the battery case 33 includes a first peripheral wall 3311. The first peripheral wall 3311 encloses to define the first opening 3312. The waterproof cover 332 includes a bottom wall 3321. An edge portion of the bottom wall 3321 extends upward to form a second peripheral wall 3322. In an embodiment, the bottom wall 3321 and the second peripheral wall 3322 can be formed as an integral structure. The second peripheral wall 3322 defines a waterproof groove 33221 facing the first peripheral wall 3311. The waterproof groove 33221 may be U-shaped. The waterproof ring 3323 is disposed within the waterproof groove 33221. When the waterproof cover 332 is assembled with the case body 331, the waterproof ring 3323 is positioned between the second peripheral wall 3322 and the first peripheral wall 3311, and the second peripheral wall 3322 and the first peripheral wall 3311 cooperatively compress the waterproof ring 3323, such that the second peripheral wall 3322 and the first peripheral wall 3311 can be sealingly connected with each other.

In an embodiment, as shown in FIG. 4 and FIG. 5, the waterproof ring 3323 includes a plurality of sealing layers 33231 extending laterally. The plurality of sealing layers 33231 are arranged at intervals and are sealingly connected to the first peripheral wall 3311, forming a multi-layer seal in the direction of rainfall, which further enhances the sealing performance.

In an embodiment, as shown in FIGS. 8 to 10, to ensure ideal sealing performance between the case body 331 and the second end 112 of the candle tube 11, the case body 331 is sealingly connected to the second end 112 of the candle tube 11 by an adhesive. The case body 331 and the candle tube 11 may be made of plastic materials, and the adhesive may be epoxy resin adhesive, acrylate adhesive, and so on.

In an embodiment, as shown in FIGS. 8 to 10, the case body 331 further includes a third peripheral wall 3313. The first peripheral wall 3311 horizontally extends outward to form a horizontal wall, the horizontal wall then bends upward to form the third peripheral wall 3313, such that the third peripheral wall 3313 can be spaced apart from the first peripheral wall 3311. In an embodiment, the case body 331 is made of plastic material, the third peripheral wall 3313 can be elastically deformable, therefore, the third peripheral wall 3313 can tightly abut against an inner surface of the candle tube 11 at the second end to form a preliminary sealing connection. To further enhance the sealing performance, the adhesive can be applied between the third peripheral wall 3313 and the second end 112 of the candle tube 11.

In an embodiment, as shown in FIGS. 8 to 10, the case body 331 further includes a top wall 3314, a fourth peripheral wall 3315, the battery 3316, and a battery cover 3317. The top wall 3314 and the fourth peripheral wall 3315 protrude inwardly toward the candle tube 11. The top wall 3314 and the fourth peripheral wall 3315 cooperatively define a battery chamber 3318, and the battery 3316 is disposed within the battery chamber 3318. A second opening 3319 is defined at a lower portion of the battery chamber 3318. The battery cover 3317 is detachably mounted on the second opening 3319, and is configured to seal or open the second opening 3319. The fourth peripheral wall 3315 extends outwardly to connect with the first peripheral wall 3311. To be specific, a bottom of the first peripheral wall 3311 extends outwardly in a horizontal direction and is connected with the fourth peripheral wall 3315 to form a stepped structure. When installing or replacing the battery 3316, the user first removes the waterproof cover 332 to expose the battery cover 3317, and then detaches the battery cover 3317 to access the battery 3316. Accordingly, the top wall 3314, the fourth peripheral wall 3315, and the first peripheral wall 3311 cooperatively form a sealed and maintenance-friendly structure for accommodating the battery 3316, such that the rainwater is unable to enter the candle tube 11 from the bottom.

In an embodiment, with reference to FIGS. 4, 5, 7, and 9, the first end 111 of the candle tube 11 is closed to form an end surface 1111. The drainage groove 1113 is defined in an outer portion of the end surface 1111 and is formed as the annular structure. The end surface 1111 includes the central portion, the descending surface 1114 is formed between the central portion and the drainage groove 1113, and the central portion is higher than the drainage groove 1113, such that rainwater falling on the end surface 1111 can converge and flow into the drainage groove 1113. The drainage hole 1115 is defined in the drainage groove 1113. An outlet hole 33110 is defined at an edge of the case body 331. The housing assembly 1 further includes a drainage pipe 114. The drainage pipe 114 includes an inlet end 1141 and an outlet end 1142. The inlet end 1141 is in communication with the drainage hole 1115, and the outlet end 1142 is in communication with the outlet hole 33110. Rainwater converges into the annular drainage groove 1113, then flows into the drainage pipe 114 through the drainage hole 1115, and is finally discharged through the outlet hole 33110 located at the edge of the case body 331. In this way, rainwater can be smoothly guided and discharged, which effectively avoids water accumulation.

In an embodiment of the present disclosure, as shown in FIGS. 5, 7, and 9, a water guiding post 1117 is configured to communicate with the drainage hole 1115. The water guiding post 1117 is a hollow cylindrical structure extending inward from the drainage hole 1115 into the candle tube 11. An outer diameter of the water guiding post 1117 is smaller than an inner diameter of an inlet end 1141 of the drainage pipe 114, such that the drainage pipe 114 can be sleeved over the water guiding post 1117. A water guiding post 33111 is communicated with the outlet hole 33110, and the water guiding post 33111 is a hollow cylindrical structure extending upward from the outlet hole 33110. An inner diameter of the water guiding post 33111 is greater than an outer diameter of an outlet end 1142 of the drainage pipe 114, such that the water guiding post 33111 can be sleeved over the outlet end 1142. In this way, rainwater can flow steadily, and a drainage performance is enhanced.

In an embodiment of the present disclosure, as shown in FIG. 9, a plurality of support legs 334 are arranged below the battery case 33 to space apart the battery case 33 and a placement surface, preventing the battery case 33 from being soaked in rainwater on the placement surface.

In an embodiment of the present disclosure, as shown in FIG. 8, an operation slot 3324 is defined in the bottom wall of the waterproof cover 332. In an embodiment, the waterproof cover 332 has two operation slots 3324 oppositely arranged with each other. During use, the user may apply a force to the two operation slots 3324 with fingers to open the waterproof cover 332.

Figure 11:
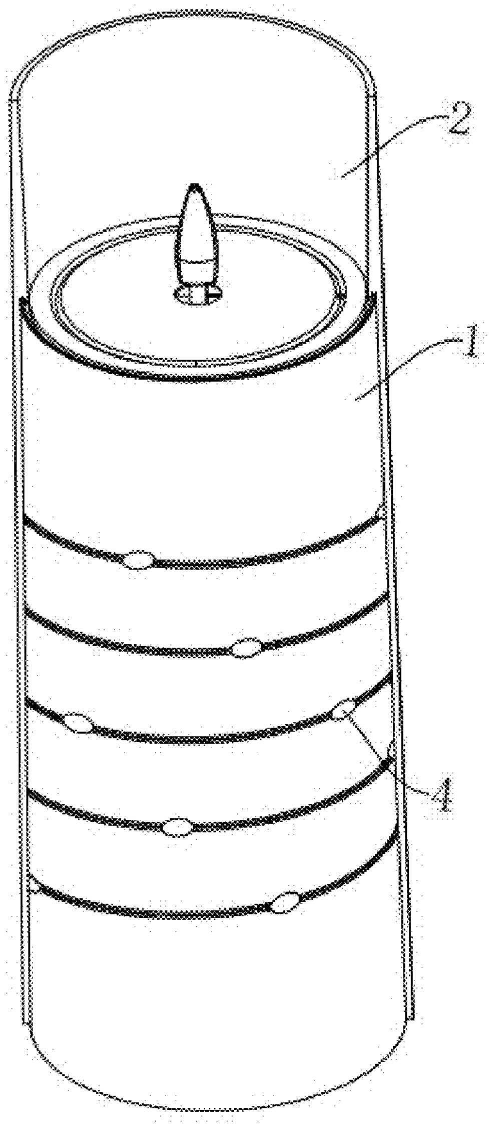
FIG. 11 is a partial sectional structural schematic view of another waterproof electronic candle according to an embodiment of the present application.

In an embodiment of the present disclosure, as shown in FIG. 11, the cover 2 is made of a transparent material, which allows effective transmission of light. A light string 4 is disposed between the candle tube 11 and the cover 2. The light string 4 may be embedded on the candle tube 11 or the cover 2, as long as the light string 4 is positioned between the candle tube 11 and the cover 2. The light emitted by the light string 4 can pass through the transparent cover 2 to achieve more varied lighting effects.

In an embodiment of the present disclosure, as shown in FIG. 4, the sealing member 12 may be configured as a sealing ring. The annular protrusion 21 is configured to pressed against the sealing ring to sealingly connect the candle tube 11 with the cover 2. In an embodiment, the sealing member is an adhesive. The adhesive is applied in the annular recess 113 to contact the annular protrusion 21. After the adhesive solidifies, the candle tube 11 and the cover 2 are sealingly connected with each other. In an embodiment, the adhesive may be UV-curable glue.

It should be noted that the above technical features may be further combined with one another to form various embodiments not specifically enumerated above, all of which are considered to fall within the scope described in the present specification. Furthermore, it will be apparent to those skilled in the art that various modifications and alterations can be made based on the above description, and all such modifications and alterations shall fall within the scope of protection defined by the appended claims of the present application.

What is claimed is:

1. A waterproof electronic candle, comprising:

a housing assembly comprising a candle tube, the candle tube comprising a first end and a second end positioned below the first end;

a cover sleeved over the candle tube, wherein an annular recess is defined in one of the candle tube and the cover at the first end, and an annular protrusion is arranged on the other one of the candle tube and the cover at the first end;

the housing assembly further comprising a sealing member received in the annular recess, wherein the annular protrusion contacts the sealing member to sealingly connect the candle tube with the cover;

wherein the first end of the candle tube comprises an end surface, a drainage groove is defined in the end surface;

wherein the housing assembly further comprises a drainage pipe, the drainage pipe is communicated with a drainage hole and an exterior of the candle tube.

2. The waterproof electronic candle according to claim 1, wherein the first end comprises an end surface, the annular recess is defined adjacent to an edge of the end surface, and an opening of the annular recess faces upwardly, and an annular flange is formed at the edge of the end surface;

the annular protrusion is formed on the cover and is configured to protrude downwardly, and an annular groove is formed adjacent to the annular protrusion;

when the annular flange is received in the annular groove, the annular protrusion contacts the sealing member.

3. The waterproof electronic candle according to claim 1, wherein a hollow cavity is defined within the candle tube, the second end has an opening communicated with the hollow cavity;

wherein the waterproof electronic candle further comprises a core assembly, the core assembly comprises a Printed Circuit Board Assembly (PCBA) and a lamp head, the PCBA is arranged within the hollow cavity and extends through the first end, the lamp head is mounted on the PCBA.

4. The waterproof electronic candle according to claim 1, wherein the cover is made of a transparent material, and a light string is arranged between the candle tube and the cover.

5. The waterproof electronic candle according to claim 1, wherein the sealing member is a sealing ring or an adhesive.

6. The waterproof electronic candle according to claim 2, wherein the cover comprises a third end and a fourth end, the third end is flush or substantially flush with the second end of the candle tube, the fourth end is positioned above the first end of the candle tube, the cover has a wall thickness that gradually decreases along an axial direction of the candle tube from the annular protrusion to the fourth end.

7. The waterproof electronic candle according to claim 3, wherein the first end comprises an end surface, a receiving recess is defined in the end surface, the receiving recess has a bottom surface, and a through hole is defined in the bottom surface, the PCBA extends through the through hole; the housing assembly further comprises a waterproof pad, the waterproof pad is arranged within the receiving recess, and the waterproof pad is in an interference fit with a recess wall of the receiving recess, and the PCBA is in an interference fit with the waterproof pad.

8. The waterproof electronic candle according to claim 3, wherein the core assembly further comprises a battery case, the battery case is electrically connected to the PCBA, the battery case comprises a case body and a waterproof cover, the case body is configured to obstruct the second end of the candle tube, the case body has a first opening facing downwardly, the waterproof cover sealingly engages the first opening through a waterproof ring.

9. The waterproof electronic candle according to claim 7, wherein a sectional area of the through hole is smaller than an area of the bottom surface of the receiving recess, and a supporting surface is formed on the bottom surface of the receiving recess to support the waterproof pad.

10. The waterproof electronic candle according to claim 8, wherein the case body comprises a first peripheral wall, the first peripheral wall encloses to define the first opening, the waterproof cover comprises a bottom wall and a second peripheral wall disposed on the bottom wall, the second peripheral wall defines a waterproof groove facing the first peripheral wall, the waterproof ring is disposed in the waterproof groove and is sealingly connected to the first peripheral wall.

11. The waterproof electronic candle according to claim 8, wherein the case body is sealingly connected to the second end of the candle tube by an adhesive.

12. The waterproof electronic candle according to claim 8, wherein the first end comprises an end surface, a drainage groove is defined in the end surface and is formed as an annular structure, a descending surface is formed between a central portion of the end surface and the drainage groove, the central portion is higher than the drainage groove, and a drainage hole is defined in the drainage groove;

an outlet hole is defined at an edge of the case body, the housing assembly further comprises a drainage pipe, the drainage pipe comprises an inlet end and an outlet end, the inlet end is communicated with the drainage hole, and the outlet end is communicated with the outlet hole.

13. The waterproof electronic candle according to claim 8, wherein a plurality of support legs are provided below the battery case.

14. The waterproof electronic candle according to claim 8, wherein the waterproof cover further defines an operation slot, and the waterproof cover is configured to be grasped by a user to open the waterproof cover.

15. The waterproof electronic candle according to claim 10, wherein the waterproof ring comprises a plurality of sealing layers, each of the plurality of sealing layers is sealingly connected to the first peripheral wall.

16. The waterproof electronic candle according to claim 10, wherein the case body further comprises a third peripheral wall, the first peripheral wall horizontally extends outward and bends upward to form the third peripheral wall, the third peripheral wall abuts against an inner surface of the candle tube at the second end, and is sealingly connected to the second end of the candle tube by an adhesive.

17. The waterproof electronic candle according to claim 10, wherein the case body further comprises a top wall, a fourth peripheral wall, a battery, and a battery cover; the top wall and the fourth peripheral wall cooperatively define a battery chamber, the battery is disposed in the battery chamber, the case body has a second opening facing downwardly, the second opening is communicated with the battery chamber, the battery cover is detachably mounted on the second opening, and the fourth peripheral wall extends outwardly to connect to the first peripheral wall.

18. The waterproof electronic candle according to claim 12, wherein the drainage hole is communicated with a water guiding post, the outlet hole is communicated with a water discharging post, the inlet end is connected to the water guiding post, and the outlet end is connected to the water discharging post.

* * * * *